Nov. 8, 1949     G. A. PEPLE, JR     2,487,367
DAMPER
Filed Aug. 31, 1945     4 Sheets-Sheet 1

INVENTOR
GUSTAVE A. PEPLE, Jr.
BY
Pennie, Davis, Marvin & Edmonds
ATTORNEYS

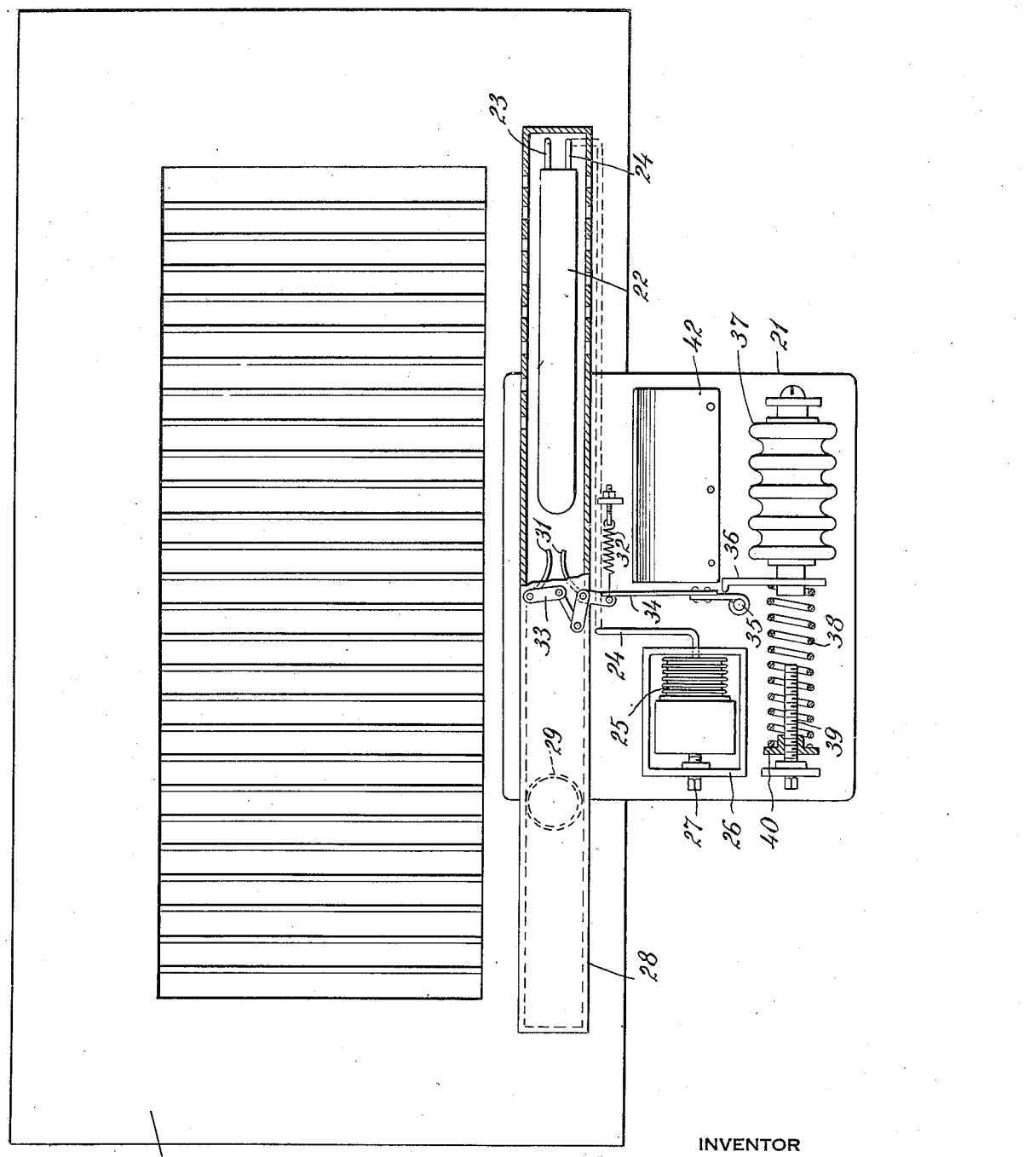

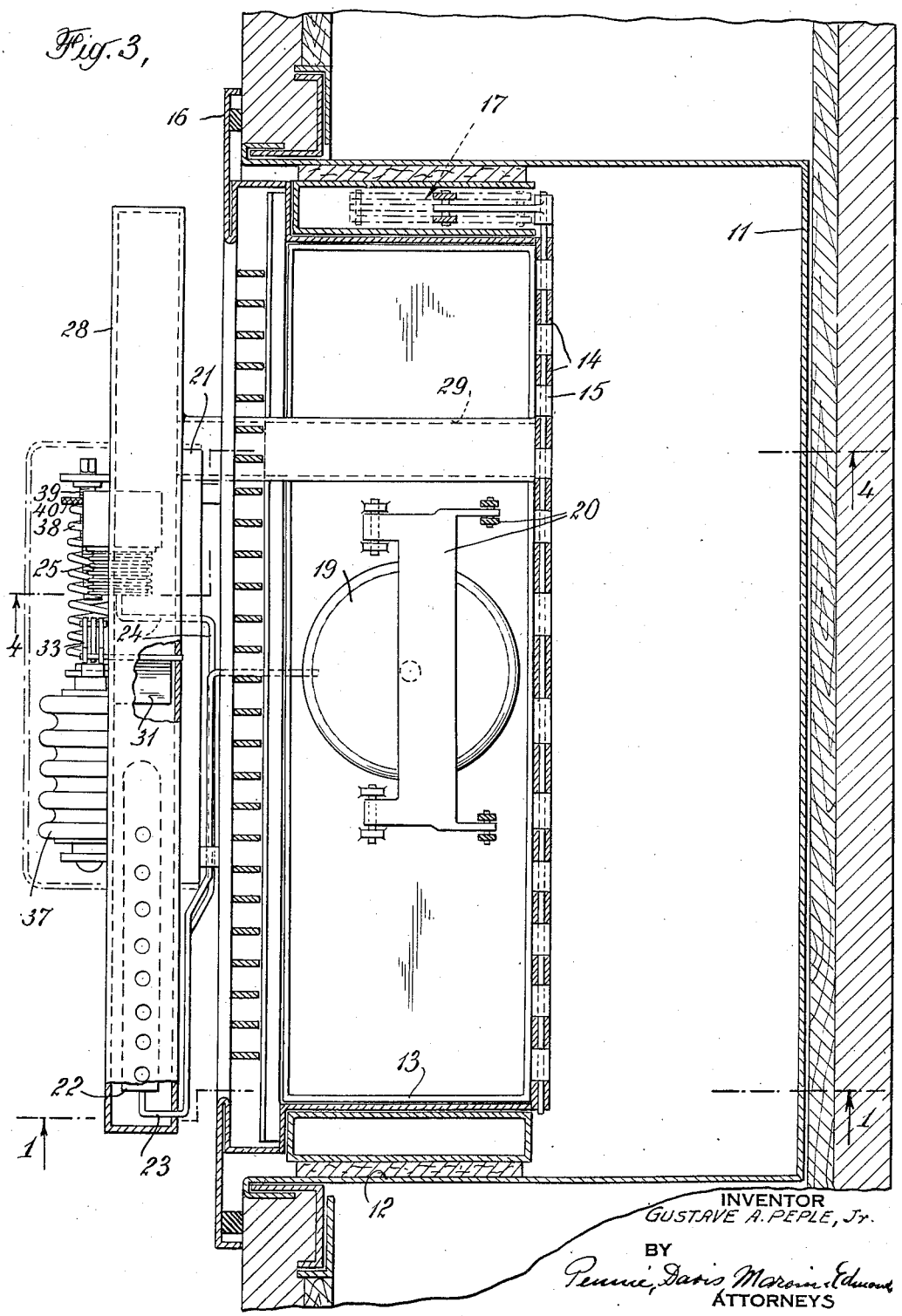

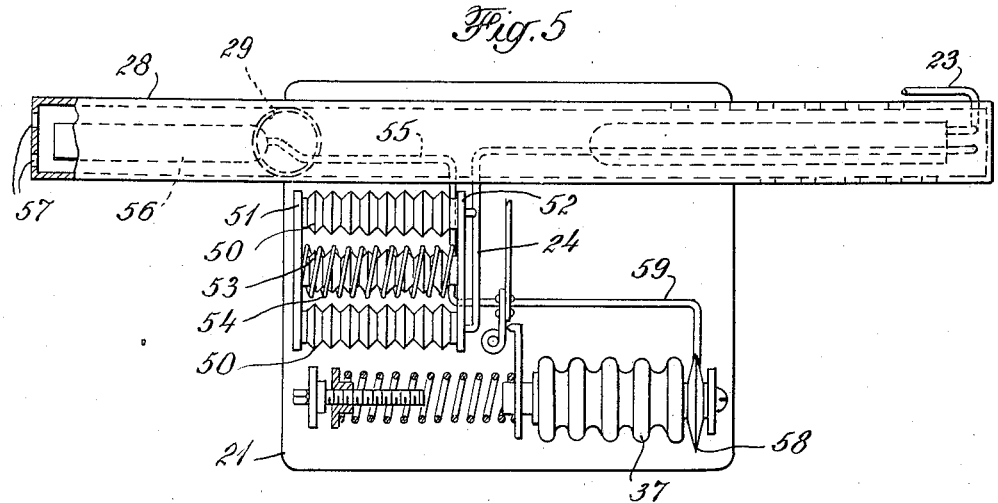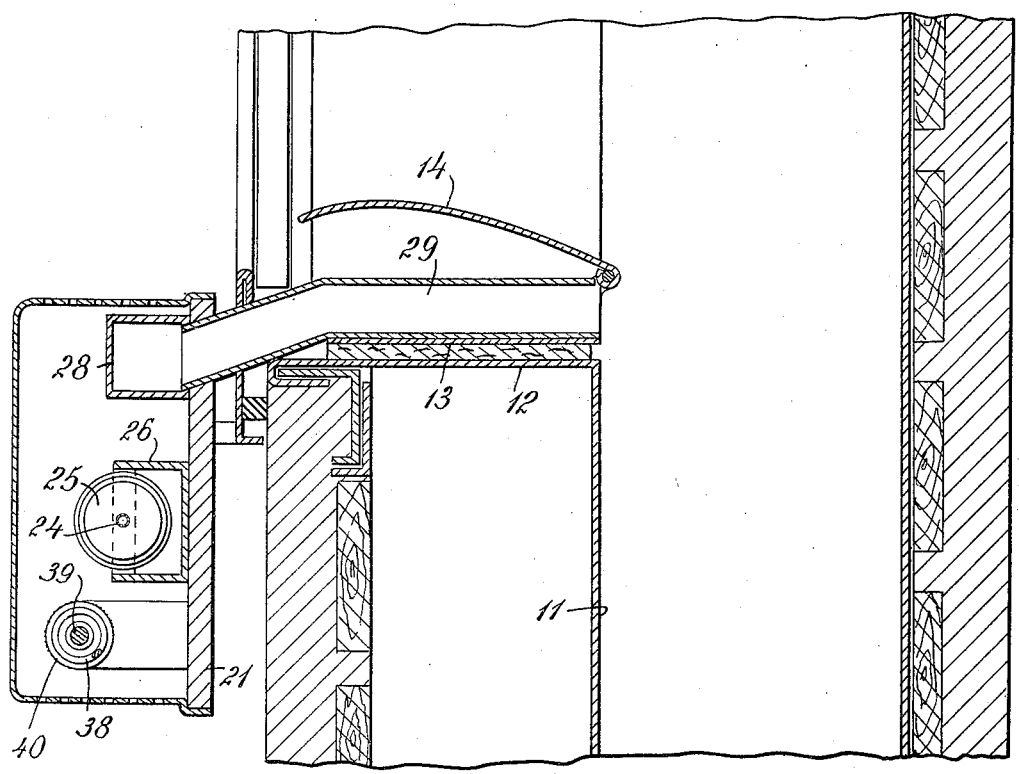

Patented Nov. 8, 1949

2,487,367

UNITED STATES PATENT OFFICE 2,487,367

DAMPER

Gustave A. Peple, Jr., Richmond, Va.; Bank of Commerce and Trusts, executor of said Gustave A. Peple, Jr., deceased Application August 31, 1945, Serial No. 613,857

2 Claims. (Cl. 236—49)

1

This invention relates to dampers and operating means therefor, for use in regulating the flow of heated, cooled, or otherwise conditioned air supplied to a room or other enclosure.

My invention is primarily useful in regulating the flow of air in accordance with the temperature of the room to which the air is supplied to maintain the temperature constant by varying the quantity of heated or cooled air, as may be necessary to meet changing weather or other conditions which affect the temperature of the room, and the primary object of my invention is to provide a damper and operating means therefor wherein the power for operating the damper is obtained from the heat in the air itself so that no power connections, electric, pneumatic or otherwise, are required for operating the damper.

It is customary in heating systems, cooling systems, and combined heating and cooling systems, to employ a room thermostat to control an electric, pneumatic, or other motor connected with a damper for regulating the flow of air from the supply duct to the room. For example, in a hot air heating system the hot air from the furnace may be supplied to a number of rooms from a common duct and individually selected room temperatures may be maintained by individual thermostats in the respective rooms which control dampers in the branch ducts supplying the particular rooms. Prior to my invention it was necessary to provide for these individual dampers individual operating motors each of which had to be connected with a source of power.

In the improved system of my present invention no outside power connection of any kind is required. The adjustment of the damper is accomplished by energy derived directly from the heat in the air in the room, or the supplied air, and no connections of any kind are required.

A further advantage of my invention is that the temperature-responsive fluid which serves to operate the damper is permanently sealed in the system and once the system is properly adjusted it will operate indefinitely with no attention. The movable parts are few in number and operate at such slow speeds that the wear is insignificant.

In the drawings I have illustrated as the preferred embodiment of my invention apparatus which can be used in winter for regulating the admission of heated air into individual rooms from a common supply duct, and in summer for the admission of cold air with no change other than in adjustment to compensate for the change in the temperature of the air in the duct, and an adjustment of the room thermostat if it is desired that a different temperature be maintained in the rooms. I have also shown as a modification of my invention an attachment wherein the apparatus requires no change in adjustment when cold air is supplied to the duct instead of warm air, and vice versa. The modified apparatus may be initially adjusted for the desired winter temperature and the desired summer temperature, and when cold air is supplied to the duct instead of hot air, or vice versa, the control device will automatically shift itself to maintain the desired temperature.

In the accompanying drawings;

Fig. 2 is a front elevation of the installation shown in Fig. 1 with certain portions shown in section;

Fig. 3 is a transverse section on line 3—3 of Fig. 1;

Fig. 4 is a sectional view on line 4—4 of Fig. 3; and

Fig. 5 is an elevational view partly in section of the above described modification wherein the re-setting of the control is accomplished automatically.

Figure 1:
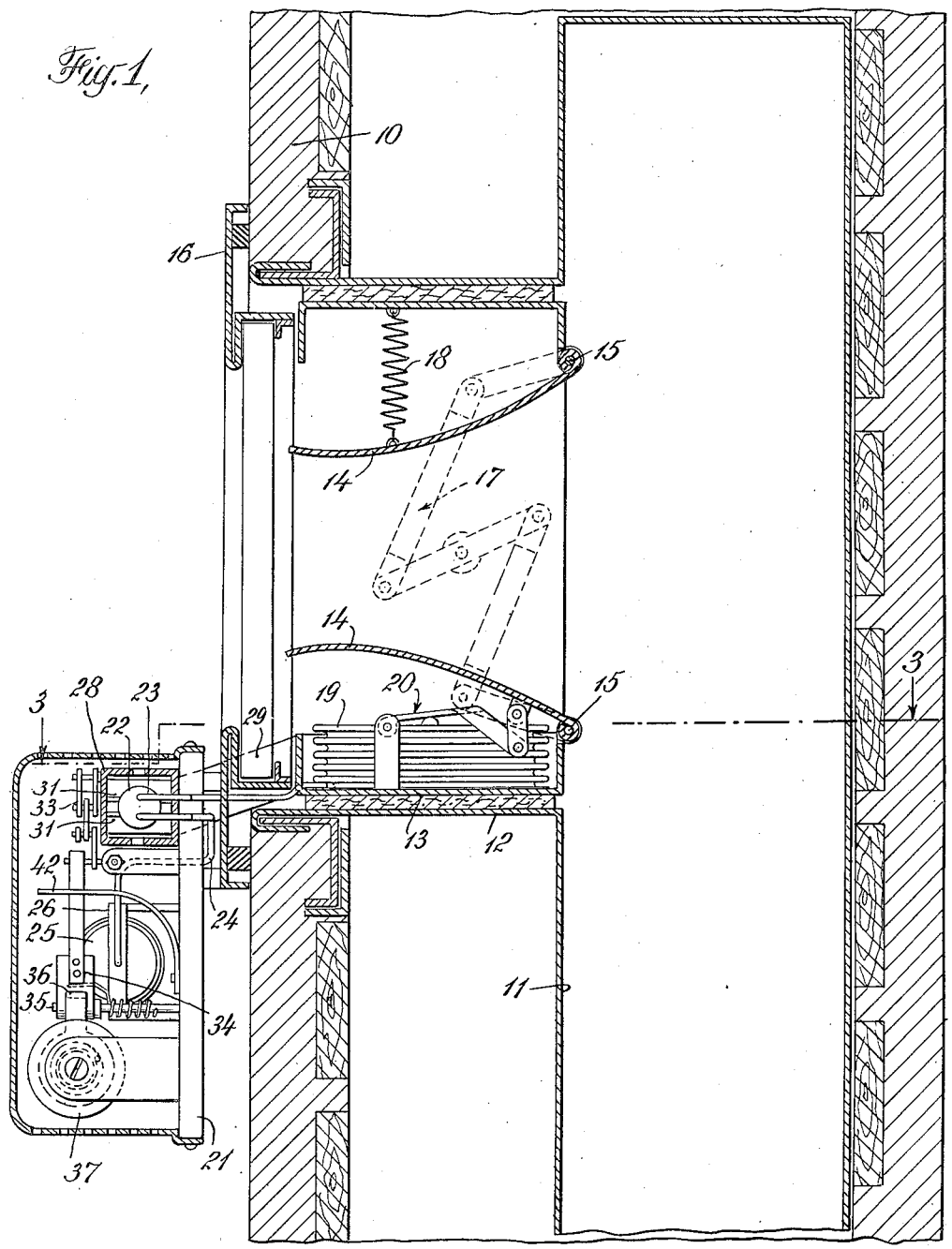
Fig. 1 is a vertical section through the wall of a house showing my improved damper construction installed in a branch duct in such wall.

Referring to the drawings, particularly to Fig. 1, 10 indicates the lath and plaster sections of an inner partition wall containing a common duct 11 for supplying heated or cooled air to several rooms. 12 indicates the branch duct which leads from the duct 11 into the room to the left of the partition wall. Mounted in the branch duct 12 is a frame 13 in which is supported the regulating dampers 14. The frame is preferably of rectangular configuration with its long axis horizontal and of a size slightly smaller than the branch duct 12, so that felt or similar material may be interposed between the damper and the frame to make a tight seal, notwithstanding irregularities in the duct. The dampers 14 are hinged at 15 along their rear edges to the adjacent portion of the fame 13, and the frame opening is concealed by a suitable grille 16 independently attached to the wall in the usual manner.

The dampers selected for illustration in Fig. 1 are of the constant velocity type disclosed in my prior Patent No. 2,281,615, and consist essentially of curved blades which in their fully open position lie parallel with the upper and lower walls of the duct. The damper blades are connected for equal and opposite operation by means of a link and lever system indicated generally by the reference character 17, and which is supported at one vertical end wall of the frame as shown in Fig. 3. A tension spring 18 is connected to one of the damper blades and the adjacent wall of the frame to normally hold the dampers in open position, and the closing of the dampers against the tension of the spring is accomplished by means of an expansible fluid supplied as hereinafter described to a sealed metal bellows 19 interposed between the other blade of the damper and the adjacent wall of the frame 13. The bellows is fixed at its bottom end to the frame 13 and the motion of its upper end as expanded by the operating fluid acts through a lever system, indicated generally at 20, to turn the adjacent damper blade 14 on its axis and through the linkage 17 to correspondingly adjust the other damper blade against the tension of the spring 18.

The container for the operating fluid for the bellows 19 and the temperature-responsive control mechanism for regulating the expansion of the fluid in the container are mounted on a panel board 21 preferably supported by the grille 16 and occupying a position immediately below the opening through the grille from the branch duct into the room.

The operating fluid, which may be any suitable volatile liquid such, for example, as employed in domestic refrigerators, is contained in a cylinder 22 from one end of which a pipe 23 extends through the frame of the grille 16 to an intake opening in the bottom end of the bellows, as shown more particularly in Fig. 1. Another pipe 24 leads from the end of the cylinder 22 to a regulating bellows 25 by means of which the total cubic content of the cylinder, the pipe system and the regulating bellows may be adjusted to vary the temperature range through which the control system is responsive. The quantity of liquid in the system is proportioned to the cubic capacity of the connected container and expansion chamber such that all the liquid will be vaporized at a temperature corresponding to the lowest temperature to which the cylinder 22 will be exposed for the particular operating range for which the instrument is set. For example, for wintertime operation the lowest temperature to which the cylinder 22 will be subjected will be slightly above the ordinary room temperature. The boiling point of the selected liquid should be such that the pressure exerted by the confined liquid at the above mentioned temperature will be just sufficient to overcome the gravity and the inertia of the parts so that upon increases in temperature the confined vapor will expand and cause the main dampers to begin to close. By reducing the cubic content of the connected vessels in which the volatile liquid is confined all the liquid will be vaporized and the confined vapor will develop the desired initial pressure—necessary to operate the dampers—at a lower temperature. Hence, by adjusting the cubic content of the connected vessels in which the volatile liquid is confined, the range of temperatures over which the regulator is operated can be varied. In the apparatus shown in Figs. 1, 2 and 3, this adjustment of temperature range is effected manually. For example, the winter setting of the apparatus may be for an average duct temperature of 120° to maintain a winter room temperature of 72°, while for summer the apparatus will be adjusted for a duct temperature of 55° to maintain a summer temperature of 80°.

The adjusting bellows 25 consists merely of a metal bellows fastened at one end to a rectangular frame 26 supporting a screw-operated abutment 27 engaging the other end of the bellows so that the extent to which it can expand may be regulated as desired.

The cylinder 22 is supported within an elongated rectangular duct-like cover 28 supported on the panel board 21 and extending beyond the ends of the panel board on each side.

Means are provided for varying the temperature of the cylinder 22, by means of air from the duct to thereby open or close the dampers when the room temperature changes to deliver more or less air to the room, as may be necessary to maintain the desired room temperature. To this end the duct 28 is connected to the main duct 11 by means of a pipe 29. Between the pipe 29 and the cylinder 22 are regulating dampers 31, the dampers being biased toward closed position by a tension spring 32. The dampers as illustrated are of the same type as the main dampers and are connected together by linkage 33 for simultaneous operation. The walls of the duct 28 are perforated adjacent the cylinder 22 to permit the escape of the air from the main duct 11.

For operating the dampers 31 a spring arm 34 is provided which is pivoted to the panel board at 35 and engaged at a point above its pivot by an operating member 36 which in turn is attached to the movable end of a temperature responsive bellows 37 mounted on the panel board. The expansion of the bellows 37 is opposed by a spring 38 whose tension may be adjusted by a screw 39 having a calibrated adjusting knob 40. The tension of the spring is adjusted in accordance with the temperature to be maintained in the room. At the desired temperature the damper blades 31 are in an intermediate position so as to respond to either an increase or a decrease in the room temperature. Hence the knob 40 will be adjusted so that the parts are in the position shown at whatever temperature it is desired to maintain in the room. The panel board is preferably enclosed in a cover cut away to permit the ends of the cover or duct 24 to protrude and the cover is perforated at the top and bottom to permit air to circulate through the casing and maintain the fluid in the bellows 37 at a temperature corresponding to the room temperature. To protect the bellows 37 from any down draft through the top of the casing a shield 42 may be positioned over the bellows as indicated. The flow of air through the cover of the panel board is, however, usually upward, due to the injector effect of the air discharged through the grille 11 across the top of the panel board.

The apparatus so far described operates in the following manner in controlling the flow of heated air from the duct 12. Let us assume that the room is to be heated by the admission of air from the main duct 11 which is at an average temperature of, say, 120°, and that it is desired to maintain a room temperature of 72°. The adjusting knob 40 will be adjusted to the position indicated by 72° on the calibrated knob, at which adjustment the damper-operating arm 36 is in the position shown in Fig. 3. In that position the pressure on the volatile fluid in the bellows 37 at 72° balances the pressure of the adjusting spring at 72° and the control dampers are partly open. In this position the hot air from the duct is partially cut off from the cylinder 22 containing the volatile fluid for operating the damper and the damper will be at some intermediate position where the pressure of the operating fluid balances the tension of the spring 18. If the room becomes colder through the admission of outside air or through other causes, the pressure against the counterbalance spring 38 of the bellows 37 will be reduced by the contraction of the fluid in the bellows and the operating arm 36 will move to the right as shown in Fig. 2, thereby further closing the dampers 31 and reducing the heat supplied to the cylinder 22 from the air in the duct. The cooling of the fluid in the cylinder 22 reduces the pressure of the volatile fluid in the bellows 19, permitting the spring 18 to open the dampers 14 to a greater extent and thus admit additional hot air to the room. As the temperature of the room rises the volatile fluid in the regulating bellows 37 will cause the bellows to expand, thereby shifting the operating arm 36 to the left to open the dampers 31 to a correspondingly greater extent and increase the flow of hot air over the cylinder 22 and thereby operate the main dampers to reduce the volume of air entering the room.

Should the temperature in the room rise above the desired point the reverse operation takes place. That is, the regulating bellows 37 expands, thereby opening the regulating damper 31 to a greater extent and delivering more hot air from the duct to the cylinder 22. This in turn increases the pressure in the bellows 19 and shifts the main dampers 14 to reduce the volume of air delivered to the room.

All the movements of the parts are slow and the dampers reach a position of equilibrium with each change in condition, with little hunting. The apparatus is practically noiseless and as a control of a heating system is fully automatic in operation.

The same apparatus without change other than a readjustment of the control bellows 25 controls the delivery of cold air from the main duct 11 for maintaining the room temperature below outside temperature in the summer time. For cold air operation the temperature range of operation must necessarily be lower than when the admission of hot air is regulated. Hence, for cold air regulation the total content of the operating fluid chamber, that is, the cylinder 22, the bellows 19, the regulating bellows 25 and the connecting pipes, is reduced by contracting the regulating bellows to the necessary extent. Also, if desired, the temperature may be maintained at a higher level in the summer time, for example, 80° as compared with 72° winter temperature. This adjustment is accomplished by adjusting the tension of the spring 38 through the medium of the screw 40.

With the apparatus readjusted as described, it operates the dampers 14 to reduce the inflow of cold air when the temperature in the room falls below the desired point, and to increase the damper opening when the temperature rises. Thus, if we assume that the dampers are in the position shown in Fig. 1 and the temperature in the room falls below the desired point, the regulating bellows 37 will respond to the temperature change and the spring 38 will expand, allowing the regulating dampers to be shifted in a direction to reduce the flow of cold air from the duct over the cylinder 22. Increasing the temperature of the cylinder 22 effects the expansion of the volatile fluid in the system, so that the bellows 19 will shift the dampers to reduce the flow of cold air in the room. The reverse operation will of course take place should the temperature in the room rise above the desired point.

In Fig. 5 I have shown a modification of the regulating apparatus whereby both the temperature operating range and the setting of the regulating bellows 37 are automatically accomplished when the change from hot air to cold air in the main duct takes place. This apparatus also automatically re-sets the system when the change is made back again to hot air for winter heating.

In this modification, instead of employing the manually adjusted cylinder 25, the pipe 24 from the cylinder 22 is connected to a pair of bellows 50 supported at one end by a fixed base 51 attached to the panel board 21 and connected at their other ends by a cross piece 52, which thereby moves in unison with the expansion and contraction of the bellows. Between the bellows 50 is a third bellows 53 which is surrounded by a compression spring 54 working between the fixed base 51 and the movable connecting bar 52. The bellows 53 is connected by a pipe 55 with a cylinder 56 which contains a volatile operating fluid.

The cylinder 56 is located between the pipe 29 at the end of the duct or casing 28 away from the cylinder 22. Openings 57 are provided in an adjacent wall of the casing 28 to permit the escape of air from the pipe 29 leading to the main duct 11.

The arrangement so far described changes the capacity of the main operating circuit, that is, the cylinder 22, bellows 19, bellows 50 and connecting pipes to alter the operating range of the system from summer to winter conditions, and vice versa, according to whether hot air or cold air is delivered to the main duct 11.

The operation of the modified structure is as follows: As the cylinder 56 is continually exposed to air delivered through the pipe 29 and discharged through the openings 57, the gas in the cylinders and the connected bellows 53 will vary in volume with the duct temperature. Hence when cold air is delivered to the duct the bellows 53 will partially collapse and the cross bar 52 connecting the bellows 50 will be shifted to a position corresponding to the reduced capacity of the bellows 53. This movement of the cross-bar 52 reduces the capacity of the operating circuit for the main damper 14 so that the operating range from fully open to fully closed position will be below the temperature for which the regulating knob 40 is set. Likewise, of course, when the air in the duct is changed from cold air to hot air for winter heating, the fluid in the cylinder 56 will expand, thereby expanding the intermediate bellows 53 and shifting the cross bar 52 to the right to increase the capacity of the operating circuit.

I may also provide means for altering the thermostat setting to different positions for summer and winter conditions. This means comprises a small expansible capsule 58 mounted between the end of the thermostat bellows 37 and its fixed abutment 37'. This capsule 58 is connected by a pipe 59 with the pipe 55 leading to the cylinder 56. The resilience of the capsule 58 is such that it will be fully expanded when the fluid in the cylinder 56 is above 90° and will be fully collapsed when the fluid in the cylinder is below 68°. The thickness of the capsule corresponds to the movement of the adjusting nut 39, which would be required to change the thermostat setting from winter to summer conditions.

It will be understood, of course, that the apparatus shown and described is a preferred embodiment of the invention to the extent that it has been perfected and adapted for commercial operation at the date of this application. It will be understood, however, that the apparatus may be variously modified. Any suitable form of damper may be employed instead of the particular damper of my prior patent. Other "motors" for utilizing the changes in pressure generated by volatile fluid on change in temperature may be substituted for the bellows acting directly on the back of the damper blade. Also a separate bellows or other motor may be utilized for each blade. It is therefore to be understood that my invention is not limited to the particular embodiment shown except insofar as defined in the appended claims.

In the appended claims I have used the word "motor" in its generic sense of a prime mover for converting the energy in other forms into motion. The claims are intended to cover any form of prime mover wherein the energy is derived from the heat in the air as distinguished from remote source.

I claim:

1. A damper for regulating the flow of air from a supply stream, an expansible chamber for positioning said damper in accordance with the expansion and contraction of said chamber, a container for a volatile fluid connected to a movable part of said chamber, an enclosure surrounding said container, means for delivering air to said enclosure directly from the supply stream controlled by said first damper, a control damper in said enclosure between said air delivery means and said container, a thermostat for positioning said control damper in accordance with the temperature of the space beyond the delivery side of said damper, and means responsive to the temperature of said supply stream for varying the capacity of said expansible chamber and container.

2. A damper for regulating the flow of air from a supply stream, an expansible chamber for positioning said damper in accordance with the expansion and contraction of said chamber, a container for a volatile fluid connected to a movable part of said chamber, an enclosure surrounding said container, means for delivering air to said enclosure directly from the supply stream controlled by said first damper, a control damper in said enclosure between said air delivery means and said container, a thermostat for positioning said control damper in accordance with the temperature of the space beyond the delivery side of said damper, and means responsive to the temperature of said supply stream for altering said thermostat setting.

GUSTAVE A. PEPLE, JR.

REFERENCES CITED

The following references are of record in the file of this patent:

UNITED STATES PATENTS

| Number | Name | Date |
| --- | --- | --- |
| 1,181,443 | Fulton | May 2, 1916 |
| 1,185,347 | Roller | May 30, 1916 |
| 2,072,617 | Cate | Mar. 2, 1937 |
| 2,117,529 | Wile | May 17, 1938 |
| 2,120,938 | Kronmiller | June 14, 1938 |
| 2,121,625 | Crago | June 21, 1938 |
| 2,181,427 | Grant | Nov. 28, 1939 |
| 2,187,767 | Akers | Jan. 23, 1940 |
| 2,238,807 | Dube | Apr. 15, 1941 |
| 2,297,872 | Carter et al. | Oct. 6, 1942 |